United States Patent
Wickel

(10) Patent No.: US 11,059,953 B2
(45) Date of Patent: Jul. 13, 2021

(54) USE OF ADDITIVES FOR INCREASING THE TENSILE SHEAR STRENGTH AND COMPOSITION CONTAINING A SILANE-FUNCTIONALIZED PREPOLYMER AND ADDITIVES

(71) Applicant: Bona GmbH Deutschland, Limburg (DE)

(72) Inventor: Holger Wickel, Weilburg (DE)

(73) Assignee: Bona GmbH Deutschland, Limburg (DE)

(*) Notice: Subject to any disclaimer, the term of this patent is extended or adjusted under 35 U.S.C. 154(b) by 0 days.

(21) Appl. No.: 16/178,695

(22) Filed: Nov. 2, 2018

(65) Prior Publication Data

US 2019/0136012 A1    May 9, 2019

(30) Foreign Application Priority Data

Nov. 7, 2017 (DE) .......................... 102017219755.2

(51) Int. Cl.
| | |
|---|---|
| C08K 5/134 | (2006.01) |
| C08G 18/73 | (2006.01) |
| C08G 18/83 | (2006.01) |
| C08G 18/48 | (2006.01) |
| C08G 18/71 | (2006.01) |
| C08K 5/09 | (2006.01) |
| C08G 65/26 | (2006.01) |
| C08G 65/336 | (2006.01) |

(52) U.S. Cl.
CPC ........ *C08K 5/1345* (2013.01); *C08G 18/4825* (2013.01); *C08G 18/718* (2013.01); *C08G 18/73* (2013.01); *C08G 18/837* (2013.01); *C08G 65/266* (2013.01); *C08G 65/2609* (2013.01); *C08G 65/2678* (2013.01); *C08G 65/336* (2013.01); *C08K 5/09* (2013.01); *C08G 2190/00* (2013.01)

(58) Field of Classification Search
None
See application file for complete search history.

(56) References Cited

U.S. PATENT DOCUMENTS

| | | | |
|---|---|---|---|
| 4,067,844 A | 1/1978 | Barron et al. | |
| 2009/0098388 A1* | 4/2009 | Harvey | C08L 75/04 428/429 |
| 2010/0041910 A1* | 2/2010 | Schubert | C08G 18/5096 556/445 |
| 2011/0198031 A1* | 8/2011 | Burckhardt | C08G 18/10 156/331.7 |
| 2012/0277373 A1 | 11/2012 | Zander et al. | |
| 2013/0190447 A1* | 7/2013 | Eichelmann | C08G 18/089 524/588 |

FOREIGN PATENT DOCUMENTS

| | | |
|---|---|---|
| DE | 102005041953 A1 | 3/2007 |
| DE | 102011007504 A1 | 10/2012 |
| DE | 102012223422 A1 | 6/2014 |
| EP | 0 596 360 A | 5/1994 |
| EP | 1 535 940 A | 6/2005 |
| EP | 2 093 244 A | 8/2009 |
| EP | 2 103 648 A1 | 9/2009 |
| EP | 2 178 963 B1 | 7/2013 |
| EP | 2 657 211 A2 | 10/2013 |
| WO | 2011/069966 A1 | 6/2011 |

OTHER PUBLICATIONS

Kittel, H., "Lehrbuch der Lacke and Beschichtungen" [Textbook of lacquer and coatings], Stuttgart: S. Hirzel Verlag, 2nd Edition, 2005, vol. 7 (Volume editor: Horst Reul), "Produkte für das Bauwesen, Beschichtungen, Bauklebstoffe, Dichtstoffe" [Products for the building trade, coatings, building adhesives, sealants] pp. 355ff and pp. 490ff in Chapter 7.11.2.2.2.

Müller, Bodo and Rath, Walter, "Formulierung von Kleb- and Dichtstoffen" [Formulation of adhesives and sealants], Hanover: Vincentz Network, 3rd Edition, 2015.

* cited by examiner

*Primary Examiner* — Robert T Butcher
(74) *Attorney, Agent, or Firm* — ProPat, LLC; Cathy R. Moore

(57) ABSTRACT

The present invention relates to a compound of the formula (I)

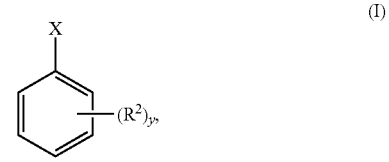

for improving the tensile shear strength of hardened compositions based on silane-modified prepolymers, a composition containing a silane-functionalized prepolymer and a compound of the formula (I), a method for the production of this composition and the use of the compound of the formula (I) in adhesives, sealants, coatings and/or primers, based on silane-functionalized prepolymers and the use of this compound for the production of adhesives, sealants, coatings and/or primers based on silane-functionalized prepolymers.

25 Claims, No Drawings

USE OF ADDITIVES FOR INCREASING THE TENSILE SHEAR STRENGTH AND COMPOSITION CONTAINING A SILANE-FUNCTIONALIZED PREPOLYMER AND ADDITIVES

CROSS-REFERENCE TO RELATED APPLICATIONS

This application claims priority to parent application German Patent Application No. 10 2017 219 755.2, filed Nov. 7, 2017, which is hereby incorporated by reference herein in its entirety.

FIELD OF INVENTION

The present invention relates to the use of additives for increasing the tensile shear strength of compositions, a composition containing a silane-functionalized prepolymer and additives, a method for the production of these compositions and the further use thereof.

BACKGROUND OF THE INVENTION

Silane-based adhesives and sealants as such are known. A general overview of silane-based adhesives and sealants is to be found for example in Bodo Müller and Walter Rath, "Formulierung von Kleb- und Dichtstoffen" [Formulation of adhesives and sealants], Hanover: Vincentz Network, 3$^{rd}$ Edition, 2015. A formulation for a parquet adhesive is to be found in H. Kittel "Lehrbuch der Lacke and Beschichtungen" [Textbook of lacquer and coatings], Stuttgart: S. Hirzel Verlag, 2$^{nd}$ Edition, 2005, Volume 7 (Volume editor; Horst Reul), "Produkte für das Bauwesen, Beschichtungen, Bauklebstoffe, Dichtstoffe" [Products for the building trade, coatings, building adhesives, sealants]. On pp. 355ff of this volume, Roland Krieger describes building adhesives. In the same volume on pp. 490ff in Chapter 7.11.2.2.2 sealant compositions based on MS polymers (products of the Kaneka Co.) are described by Christoph Hollbeck.

Adhesives and sealants must fulfil certain requirements. An important property of adhesive and sealant compositions is that in the hardened state these possess an adequate, often high, early strength.

DE 10 2011 007 504 A1 describes crosslinkable polyurethane compositions in which a retardant substance is used. This retardant substance is to have the effect that in a so-called induction phase the catalytic reactivity of the catalyst is decreased and thus allows processing of the composition over a certain period. As retardant substances, cyclic α-hydroxyketones or triphenols with three adjacent OH groups are used. However, this document does not give details as to what influence the retardant substances have on the strength of the hardened composition.

SUMMARY OF ADVANTAGEOUS EMBODIMENTS OF THE INVENTION

The purpose of the present invention is to improve the tensile shear strength of hardened compositions based on silane-functionalized prepolymers.

DETAILED DESCRIPTION OF ADVANTAGEOUS EMBODIMENTS OF THE INVENTION

The present invention relates to a compound of the formula (I) and its use

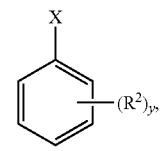

for improving the tensile shear strength of hardened compositions based on silane-functionalized prepolymers, wherein X is selected from the group consisting of —H, residues with 1 to 12 C atoms and a substituent —C(=O)—R$^1$, wherein R$^1$ is selected from the group consisting of —OH, and residues with 1 to 25 C atoms, and wherein y=5 and the residues R$^2$ are the same or different and are selected from the group consisting of —H, —OH and residues with 1 to 12 C atoms.

Furthermore, X can represent, an OH group.

It was surprisingly found that compositions which contain the additives in the form of a compound according to the formula (I) have an increased tensile shear strength in the hardened state compared with a composition which contains no compound of the formula (I).

As residues with 1 to 12 C atoms, for X and R$^1$, residues which are selected from the group comprising substituted and unsubstituted, linear and branched C1 to C12 alkyl groups, preferably C1 to C8 alkyl groups, especially preferably C1 to C3 alkyl groups, substituted and unsubstituted, linear and branched C1 to C12 alkenyl groups, preferably C1 to C8 alkenyl groups, especially preferably C1 to C3 alkenyl groups, substituted and unsubstituted, linear and branched C1 to C12 alkynyl groups, preferably C1 to C8 alkynyl groups, especially preferably C1 to C3 alkynyl groups, substituted and unsubstituted, linear and branched C1 to C12 alkoxy groups, preferably C1 to C8 alkoxy groups, especially preferably C1 to C3 alkoxy groups, cyclic alkyl groups with 5 to 8 C atoms, preferably 5 to 6 C atoms, and cyclic alkenyl residues with 5 to 8 C atoms, preferably 5 to 6 C atoms, are possible.

As residues with 1 to 25 atoms, for R$^1$, residues which are selected from the group comprising substituted and unsubstituted, linear and branched C1 to C25 alkyl groups, preferably C1 to C12 alkyl groups, especially preferably C1 to C8 alkyl groups, substituted and unsubstituted, linear and branched C1 to C25 alkenyl groups, preferably C1 to C12 alkenyl groups, especially preferably C1 to C8 alkenyl groups, substituted and unsubstituted, linear and branched C1 to C25 alkynyl groups, preferably C1 to C12 alkynyl groups, especially preferably C1 to C8 alkynyl groups, substituted and unsubstituted, linear and branched C1 to C25 alkoxy groups, preferably C1 to C12 alkoxy groups, especially preferably C1 to C8 alkoxy groups, cyclic alkyl groups with 5 to 8 C atoms, preferably 5 to 6 C atoms, and cyclic alkenyl residues with 5 to 3 C atoms, preferably 5 to 6 C atoms, are possible. R$^1$ further comprises residues which are made up of several cyclic alkoxyalkenyl units, wherein these can have further hydroxy and/or alkoxy substituents and aromatic carboxylic acid derivatives as substituents. An example of such a compound is tannin.

According to the present invention, it is preferred that at least one of the residues R$^2$ is an OH group. Especially preferably, at least two of the residues R$^2$ is an OH group.

Furthermore, it is preferred that the residues R$^2$ are the same or different and represent an OH group or an K atom. Consequently, the present invention relates to the use of a compound of the formula (I) for improving the tensile shear strength of hardened compositions based on silane-modified prepolymers, wherein one of the residues $R^2$ represents an OH group and four residues $R^2$ represent an H atom, or two of the residues $R^2$ represent an OH group and three of the residues $R^2$ represent an H atom, or three of the residues $R^2$ represent an OH group and two of the residues $R^2$ represent an H atom, or four of the residues $R^2$ represent an OH group and one of the residues $R^2$ represents an H atom or all five residues $R^2$ represent an OH group. Preferably in this embodiment two of the residues $R^2$ represent an OH group and three of the residues $R^2$ represent an H atom, or three of the residues $R^2$ represent an OH group and two of the residues $R^2$ represent an H atom.

Preferably X is a substituent —C(=O)—$R^1$. In this case, it is preferred that $R^1$ represents an OH group and at least one of the residues $R^2$ represents an OH group, wherein the remaining residues $R^2$ represent an H atom. Especially preferably, $R^1$ represents an OH group, two of the residues $R^2$ represent an OH group and three of the residues $R^2$ represent an H atom.

Preferred compounds of the formula (I) are

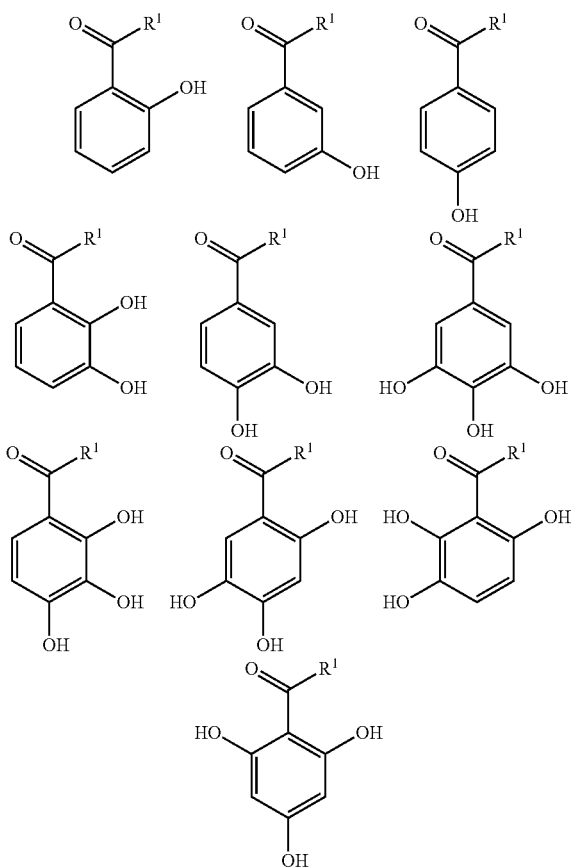

wherein $R^1$ preferably represents an OH group, a C1 to C12 alkyl group, preferably a C1 to C8 alkyl group, especially preferably a C1 to C3 alkyl group, a C1 to C12 alkoxy group, preferably a C1 to C8 alkoxy group, especially preferably a C1 to C3 alkoxy group or an H atom, quite especially preferably an OH group, According to the present invention, it is preferred that when two of the residues $R^2$ represent an OH group, the two OH groups are situated on adjacent C atoms.

Thus the present invention relates to the use of a compound of the formula (I) for improving the tensile shear strength of hardened compositions based on silane-modified prepolymers, wherein two of the residues $R^2$ represent OH groups and both of the OH groups are situated on adjacent C atoms.

When three of the residues $R^2$ represent an OH group and two of the residues $R^2$ represent an H atom, it is preferred that at least two OH groups are situated on adjacent C atoms. According to one embodiment of the invention, three of the residues $R^2$ represent an OH group, wherein all three OH groups are situated on adjacent C atoms. According to a further embodiment of the invention, three of the residues $R^2$ represent an OH group, wherein only two of the three OH groups are situated on adjacent C atoms.

Especially preferred compounds of the formula (I) are

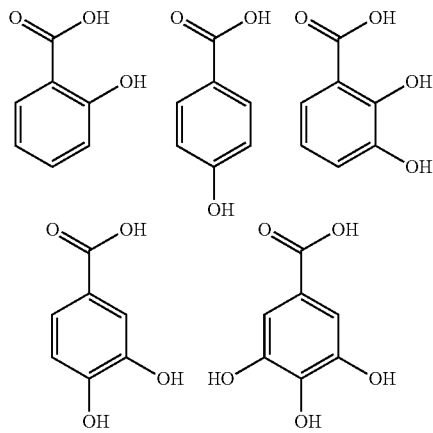

Silane-functionalized prepolymers which are suitable for the purposes of the present invention are for example described in EP-A-2 657 211, to which reference is expressly made at this point. These are silane-functionalized prepolymers of the formula (II)

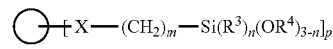

wherein
  ○ is a polymer with a molecular weight Mw of 1000 to 50000, preferably 1000 to 20000 and especially preferably 4000 to 20000,
  $R^3$ means $C_1$-$C_5$ alkyl or $C_6$-$C_{10}$ aryl, preferably methyl, ethyl or phenyl,
  $R^4$ $C_1$-$C_4$ alkyl, preferably methyl or ethyl, and
  X means —O—, —(CH$_2$)$_m$—O—, —O—CO—NR—, —O—CO—NR—Y—●—Y—NR—CO—NR— or —O—CO—NR—●—CR$_2$—●—NR—CO—NR— or wherein X together with 2 adjacent C atoms of the backbone of the polymer ○ forms a $C_5$ or $C_6$ ring and wherein
  R is the same or different and means H, $C_1$-$C_5$ alkyl, phenyl or the residue of a Michael acceptor,
  Y is the same or different, and is a linear or branched $C_1$-$C_8$ alkylene (preferably methylene) or a single bond between N and ● and
  ● means phenylene, naphthylene, cyclohexylene or $C_4$-$C_{10}$ n-alkylene, unsubstituted or 1-, 2- or 3-fold substituted with $C_1$-$C_3$ alkyl, preferably methyl and m is the same or different, and is a whole number from 1 to 8, preferably 1 to 4, especially preferably 1 to 3, n a whole number from 0 to 2, preferably 0 or 1, especially preferably 0, and p a whole number from 1 to 50, preferably 2 to 4, especially preferably 2 to 3 or for the case that X is —CH$_2$)$_m$—O—, or X with two adjacent C atoms of the backbone of the polymer ○ forms a C$_5$ or C$_6$ ring, 1 to 100, preferably 5 to 10.

By the molecular mass Mw is meant the mass average of the molecular mass, as can for example be determined with a normal commercial GPC (gel permeation chromatography (see e.g. DE102005041953A1 para, [017], whose United States equivalent is U.S. Pat. No. 8,067,522).

The polymer ○ with a molecular weight Mw of 1000 to 50000, preferably 1000 to 20000 and especially preferably 4000 to 20000 is for example a polyalkoxyalkylene, preferably a polyalkylene glycol such as polyethylene glycol, polypropylene glycol or polybutylene glycol, in particular polypropylene glycol. In these cases, p is equal to 2 or 3.

A Michael acceptor is for example an α,β-unsaturated carbonyl compound, such as α,β-unsaturated aldehydes, ketones or esters, α,β-unsaturated nitriles or carboxylic acid amides. Examples of these are acrylic acid C$_1$-C$_8$ alkyl esters, methacrylic acid C$_1$-C$_8$ alkyl esters (see e.g. U.S. Pat. No. 4,067,844), maleic acid esters and fumaric acid esters (see e.g. EP-A 0 596 360, whose United States equivalent is U.S. Pat. No. 5,364,955). The residue of the Michael acceptor "R" then corresponds to the (saturated) residue of the Michael acceptor bound in the β position.

Examples of the silane-functionalized prepolymers usable according to the invention are;

polypropylene glycol (PPG) the OH terminal groups whereof have been reacted with allyl chloride wherein the terminal double bonds arising therefrom have been hydrosilylated. Such prepolymers are commercially available under the name "Kaneka Silyl SAX®" (Kaneka Corp., Osaka, Japan) and are for example described in U.S. Pat. No. 3,371,751, to which reference is expressly made here, PPG, the OH terminal groups whereof have been reacted with isocyanato-silane. Such prepolymers are commercially available under the name "Wacker GENIOSIL" STPE" (Wacker Chemie AG, Munich, Germany) and are for example described in EP-A 1 535 940 (whose United States equivalent is U.S. Pat. No. 7,319,128), to which reference is expressly made here, PPG, the OH terminal groups whereof have been reacted with diisocyanate and the terminal isocyanate groups arising therefrom have been reacted with aminosilane. Such prepolymers are commercially available under the name "Bayer DERMOSEAL® SXP" (Bayer AG, Leverkusen, Germany). Their production is for example described in WO 2011/0699966, to which reference is expressly made here, polymer chains with side silane groups (formula (II) with p=1 to 100, preferably 5 to 10). Such prepolymers are commercially available under the name "EVONIK TEGOPAC® SXP" (Evonik Tego Chemie GmbH, Essen, Germany) and are for example described in EP-A 2 093 244 (whose United States equivalent is U.S. Pat. No. 8,450,514), to which reference is expressly made here.

Furthermore, the present invention relates to a composition containing a silane-functionalized prepolymer and a compound of the formula (I)

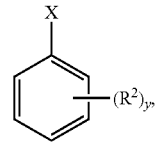

wherein X represents a substituent —C(=O)—R$^1$ and wherein R$^1$ is selected from the group consisting of —OH and residues with 1 to 12 C atoms, and wherein y=5 and the residues R$^2$ are the same or different and are selected from the group consisting of —H, —OH and residues with 1 to 12 C atoms.

The composition according to the invention contains a compound of the formula (I), in which as residues with 1 to 12 C atoms, for R$^1$ and R$^2$, residues which are selected from the group comprising substituted and unsubstituted, linear and branched C1 to C12 alkyl groups, preferably C1 to C8 alkyl groups, especially preferably C1 to C3 alkyl groups, substituted and unsubstituted, linear and branched C1 to C12 alkenyl groups, preferably C1 to C8 alkenyl groups, especially preferably C1 to C3 alkenyl groups, substituted and unsubstituted, linear and branched C1 to C12 alkynyl groups, preferably C1 to C8 alkynyl groups, especially preferably C1 to C3 alkynyl groups, substituted and unsubstituted, linear and branched C1 to C12 alkoxy groups, preferably C1 to C8 alkoxy groups, especially preferably C1 to C3 alkoxy groups, cyclic alkyl groups with 5 to 8 C atoms, preferably 5 to 6 C atoms, and cyclic alkenyl residues with 5 to 8 C atoms, preferably 5 to 6 C atoms, are possible.

According to the present invention, it is preferred that at least one of the residues R$^2$ is an OH group, Especially preferably, at least two of the residues R$^2$ represent an OH group.

Furthermore, it is preferred that the residues R$^2$ are the same or different and represent an OH group or an H atom. Consequently, the present invention relates to compositions containing a compound of the formula (I), wherein one of the residues R$^2$ represents an OH group and four residues R$^2$ represent, an H atom, or two of the residues R$^2$ represent an OH group and three of the residues R$^2$ represent an H atom, or three of the residues R$^2$ represent an OH group and two of the residues R$^2$ represent an H atom, or four of the residues R$^2$ represent an OH group and one of the residues R$^2$ represents an H atom or all five residues R$^2$ represent an OH group.

Preferably two of the residues R$^2$ represent an OH group and three of the residues R$^2$ represent an H atom, or three of the residues R$^2$ represent an OH group and two of the residues R$^2$ represent an H atom.

Preferably R$^1$ represents an OH group and at least one of the residues R$^2$ represents an OH group, wherein the remaining residues R$^2$ represent an H atom. Especially preferably, R$^1$ represents an OH group, two of the residues R$^2$ represent an OH group and three of the residues R$^2$ represent an H atom Preferred compounds of the formula (I) which are contained in the composition according to the invention are

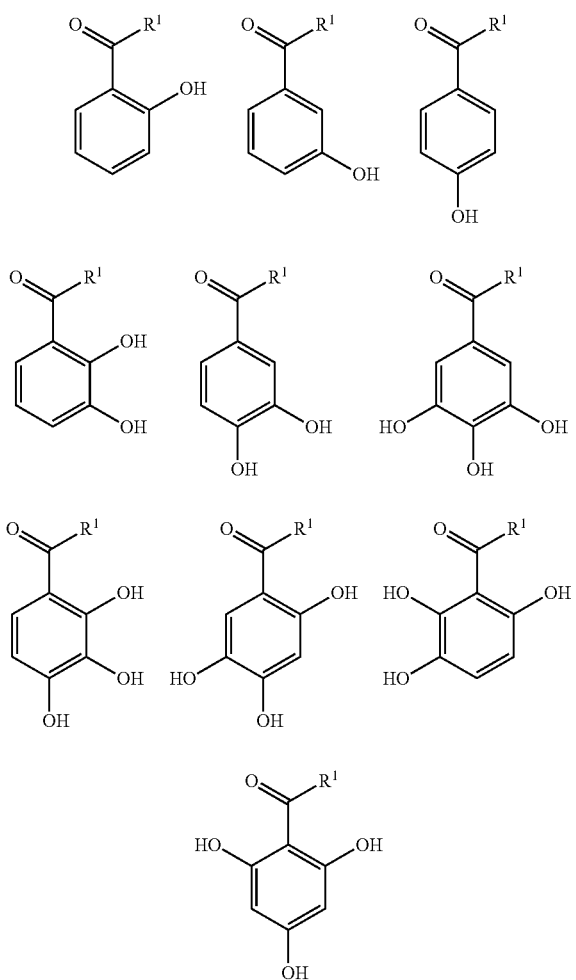

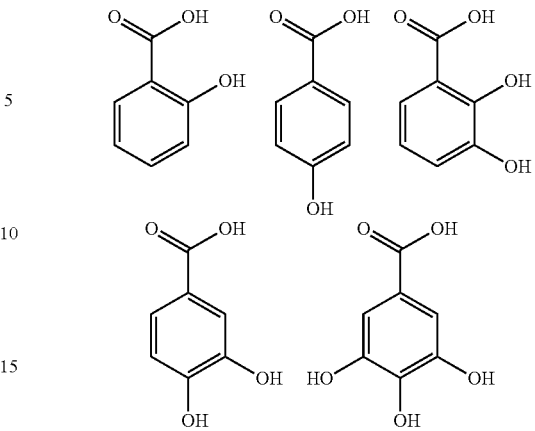

wherein R¹ preferably represents an OH group, a C1 to C12 alkyl group, preferably a C1 to C8 alkyl group, especially preferably a C1 to C3 alkyl group, a C1 to C12 alkoxy group, preferably a C1 to C8 alkoxy group, especially preferably a C1 to C3 alkoxy group or an H atom, quite especially preferably an OH group.

According to the present invention, it is preferred that when two of the residues R² represent an OH group, the at least two OH groups are situated on adjacent C atoms.

Thus the present invention relates to compositions containing a compound of the formula (I), wherein two of the residues R² represent OH groups and both of the OH groups are situated on adjacent C atoms.

When three of the residues R² represent an OH group and two of the residues R² represent an H atom, it is preferred that at least two OH groups are situated on adjacent C atoms. According to one embodiment of the invention, three of the residues R² represent an OH group, wherein all three OH groups are situated on adjacent C atoms. According to a further embodiment of the invention, three of the residues R² represent an OH group, wherein only two of the three OH groups are situated on adjacent C atoms.

Especially preferred compounds of the formula (I) which are contained in the composition according to the invention are According to the present invention, the composition contains the compound of the formula (I) in a quantity from 0.005 to 0.5 wt. %, preferably from 0.01 to 0.5 wt. %, especially preferably from 0.011 to 0.4 wt. %.

The composition can contain normal additives such as fillers, plasticizers, drying agents, adhesion promoters, coloured pigments (colourants), antioxidants, UV stabilizers, rheology additives, thinners, thickeners, catalysts, preservatives, etc.

Suitable as fillers are for example around or precipitated calcium carbonate, magnesium carbonate, calcium sulphate, barium sulphate, kaolin, dolomite, feldspar, zeolite, aluminium hydroxide and magnesium hydroxide etc., wherein these fillers can also for example be surface-modified with silanes or fatty acids. One or several different fillers can be used. Fillers are usually added in quantities from 0 to 80 wt. %, preferably 0 to 60 wt. %. Here, as also in all weight percentage information below, these relate to the mass of the whole formulation, unless otherwise stated. Commercially available fillers are for example COLLAFILL® 60 (Steinwerke Kraft, Germany) and APYRAL® 22 (Nabaltec, Germany).

As pigments, both inorganic pigments such as carbon black, iron oxide, ultramarine or zinc oxide, and also organic dyes such as anthraquinones, acridines, phthalo-cyanines, indophenols, etc. can be used. One or several different pigments or pigment preparations can be used. Pigments which promote oxidation, such as for example iron oxides, may only be used in small quantities, otherwise the total quantity of pigment is not critical. The pigments are usually added in quantities from 0 to 30 wt. %, preferably 0 to 20 wt. %. Commercially available pigments and pigment preparations or colourants are for example BAYFERROX® (Lanxness, Germany).

Suitable as antioxidants or UV stabilizers are for example sterically hindered phenols, benzophenones, benzotriazoles, oxanilides, phenyltriazines, etc. Such antioxidants or UV stabilizers are for example available under the names IRGANOX® 1076, TINUVIN® 292, TINUVIN® 327 and TINUVIN® 770 (BASF, Germany). One or several different antioxidants or UV stabilizers can be used. The total quantity of antioxidant or UV stabilizer depends on the planned use. Antioxidants of UV stabilizers are usually added in quantities from 0 to 5 wt. %, preferably 0 to 2 wt. %.

Suitable as drying agents are for example alkylsilanes, aminosilanes or vinylsilanes such as vinyltrimethoxy-silane, phenyltrimethoxysilane, alkyltrimethoxysilanes or alkyltriethoxysilanes. One or several, different drying agents can be used. The total quantity of drying agent is not critical, provided that the water content of the other raw materials is removed. Drying agents are usually added in quantities from 0.1 to 10 wt. %, preferably 0.1 to 5 wt. %. Commercially available drying agents are for example DYNASYLAN® VTMO, DYNASYLAN® OCTEO and DYNASYLAN® AMMO (Evonik, Germany).

Suitable as adhesion promoters are for example aminosilanes such as gamma aminopropyltrimethoxysilane or epoxysilanes. Oligomeric silanes, which however must be (partly) amino- or epoxy-functional, are also suitable. One or several different adhesion promoters can be used. The total quantity of adhesion promoter is not critical. Adhesion promoters are usually added in quantities from 0.1 to 10 wt. %, preferably 0.1 to 5 wt. %, Commercially available adhesion promoters are for example DYNASYLAN® AMMO, DYNASYLAN® GLYMO and DYNASYLAN® 1146 (oligomer) (Evonik, Germany).

Suitable as rheology additives are for example (hydrophobic) pyrogenic silicic acids, precipitated silicic acids, sheet silicates, amide waxes, castor oil derivatives, cellulose ethers, polyurethane, polyamide or acrylate thickeners, etc. One or several different rheology additives can be used. The total quantity of rheology additive is not critical. Rheology additives are usually added in quantities from 0 to 15 wt. %, preferably 0 to 10 wt. %. Commercially available rheology additives are for example CAB-O-SIL® TS720, CAB-O-SIL® LM 150 (Cabot, Deutschland), AEROSIL® R208 (Evonik, Germany) and Wacker H18 (Wacker, Germany).

As plasticizers or diluents, esters such as phthalates or cyclohexanedicarboxylic acid, citrates, adipates or polyethers can be used. Further, for example glycerine, polyols and polyethers, benzoates, etc. are suitable. One or several different diluents can be used. The total quantity of diluent is not critical. Diluents are usually added in quantities from 0 to 50 wt. %, preferably 0 to 30 wt. %. Commercially available diluents are for example PALATINOL® N, PALATINOL® 10 P or HEXAMOLL® DINCH (BASF, Germany), and ACCLAIM® Polyol 2200 (Covestro, Germany).

As catalysts for the crosslinking and hardening reaction, for example bis(ethyl acetoacetato)bis(isobutan-1-olato)-titanium, titanium(IV) isopropanolate, titanium (IV) acetylacetonate, iron(III) acetylacetonate, aluminium triisopropanolate, dibutyltin dilaurate, dioctyltin dilaurate, amidines or amidine derivatives, 1,4-diazabicyclo[2,2,2]octane, 1,8-diazabicyclo[5.4.0]-undec-7-ene (DBU), 1,5-diazabicyclo[4.3.0]-non-5-ene (DBN), guanidine, guanidine derivatives such as for example 1,1,3,3-tetramethylguanidine, acetic acid, acetic acid derivatives, methanesulphonic acid, p-toluenesulfonic acid, etc. are suitable. One or several different catalysts can be used. The total quantity of catalyst is not critical. Catalysts are usually added in quantities from 0 to 2 wt. %, preferably 0 to 1 wt. %.

The composition according to the invention finds use in adhesives, sealants, coatings and/or primers. Consequently, the present invention relates to the use of this compound in adhesives, sealants, coatings and/or primers based on silane-functionalized prepolymers and the use of this compound for the production of adhesives, sealants, coatings and/or primers based on silane-functionalized prepolymers.

Further, the present invention relates to a method, for the production of the compositions according to the invention comprising: mixing the silane-functionalized prepolymer of the formula (II) with a compound of the formula (I).

The method for the production of the composition according to the invention further comprises the following steps:

the plasticizer is placed in a mixer,
the drying agent is added and then mixed in,
the compound of the formula (I) is added,
the filler is added, mixed in and the mixture brought to a temperature from 40 to 100° C., preferably under static vacuum of 1 to 500 hPa.

The drying effected can be checked by a Karl Fischer titration. Then the following takes place:

the addition and the mixing in of the prepolymer advantageously under blanket gas ($N_2$, dew point <−20° C.),
the addition of an antioxidant,
thickeners are added and solubilized under blanket gas optionally at elevated temperature,
pyrogenic silicic acid is added, and mixed in under blanket gas
optionally a further drying agent is added
the adhesion promoter is added and mixed in
the catalyst/catalysts is/are added and mixed in.

The addition of the prepolymer, the antioxidant, the thickener, the pyrogenic silicic acid, the adhesion promoter and the catalysts and the optional addition of a further drying agent can alternatively be effected together in one step. Finally, the mixture (whole formulation) is degassed under vacuum.

Alternatively, the method can also be performed without the use of a plasticizer.

In this case, the method for the production of the composition according to the invention comprises the following steps:

the prepolymer is placed in a mixer,
the drying agent is added,
the compound of the formula (I) is added,
the filler is added, mixed in and the mixture brought to a temperature from 40 to 100° C., preferably under static vacuum of 1 to 500 hPa,
the addition of an antioxidant,
thickeners are added and solubilized under blanket gas optionally at elevated temperature,
pyrogenic silicic acid is added, and mixed in under-blanket gas
optionally a further drying agent, is added
the adhesion promoter is added and mixed in
the catalyst/catalysts is/are added and mixed in.

The addition of the prepolymer, the antioxidant, the thickener, the pyrogenic silicic acid, the adhesion promoter and the catalysts and the optional addition of a further drying agent can alternatively be effected together in one step. Finally, the mixture (whole formulation) is degassed under vacuum.

As used herein, the term "to which reference is expressly made here" means "hereby incorporated by reference herein in its entirety," including both the cited patent and/or publication and its United States equivalent.

EXAMPLES

Determination of the Tensile Shear Strength

The tensile shear strength is determined according to DIN EN 14293, Chapter 4.7.

Production of the Compositions

For the production of the compositions tested, the following procedure was used. 16.31 parts by weight of plasticizer diisononyl 1,2-cyclohexanedicarboxylate (HEXAMOLL® DINCH) were placed in a mixer and 1.65 parts by weight of drying agent (vinyltrimethoxysilane, DYNASYLAN® VTMO) added and then mixed. Next, 0.02 parts by weight of the compound (I) were added. Then 57.68 parts by weight of filler (calcium carbonate, COLLAFILL® 60) were mixed in and the mixture brought to a temperature of 70° C. at ca, 500 hPa. The drying effected was checked by a Karl Fischer titration. Then the addition and the mixing in of 20.37 parts by weight of prepolymer (a gamma silane based on PPG, DESMOSEAL® S XP 2458) was performed under nitrogen. Next, 0.31 parts by weight of antioxidant (3,3',3", 5,5',5"-hexa-tert. butyl-a,a'a"-(mesitylene-2,4,6-triyl) tri-p-cresol, IRGANOX® 1330), 0.55 parts by weight of thickener (amide wax, CRAYVALLAC® SLX) and 0.95 parts by weight of adhesion promoter (pyrogenic silicic acid, AEROSIL® R208) were added and stirred in under nitrogen. Then 1.09 parts by weight of drying agent and 0.96 parts by weight of adhesion promoter (aminopropyl-trimethoxysilane, DYNASYLAN® AMMO) were added and mixed in. Finally, the addition of 0.03 parts by weight of titanium catalyst (bis(ethyl acetoacetato-O1,O3)bis(2-methylpropan-1-olato)titanium (TYZOR® IBAY) and 0.08 parts by weight of amine catalyst (DBU) was performed. Finally, the mixture was degassed under vacuum.

TABLE 1

Comparison of the tensile shear strength of the different compositions

| Compound (I) | Tensile shear strength (N/mm$^2$) after one day | Tensile shear strength (N/mm$^2$) after 3 days |
|---|---|---|
| No compound (I) | 1.60 | 2.12 |
| Gallic acid | 2.32 | 2.69 |
| 3,4-dihydroxybenzoic acid | 1.92 | 2.35 |
| 2,3-dihydroxybenzoic acid | 2.02 | 2.46 |

The values in table 1 show that the compositions according to the invention in comparison to the composition without compound (I) have a higher tensile shear strength. The comparison composition, which contains no compound of the formula (I), has a tensile shear strength of 2.12 N/mm$^2$ after 3 days. The compositions tested in the examples, which contain a compound of the formula (I) have an up to 32% higher tensile shear strength.

That which is claimed:

1. A method for increasing tensile shear strength of silane-modified prepolymer compositions comprising mixing a compound of the formula (I)

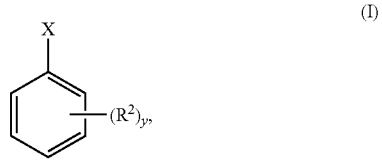

with polymer consisting of silane-modified prepolymers, wherein
X is selected from the group consisting of —OH, —H, residues with 1 to 12 C atoms, and a substituent —C(=O)—R$^1$;
R$^1$ is selected from the group consisting of —OH, and residues with 1 to 25 C atoms;
y=5; and
R$^2$ are residues that are the same or different and are selected from the group consisting of —H, —OH and residues with 1 to 12 C atoms,
and a drying agent.

2. The method according to claim 1, wherein the silane-functionalized prepolymer possesses a structure according to formula (II)

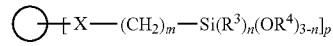

wherein:
○ is a polymer with a molecular weight Mw of 1000 to 50000;
R$^3$ is C$_1$-C$_5$ alkyl or C$_6$-C$_{10}$ aryl;
R$^4$ is C$_1$-C$_4$ alkyl;
X is —O—, —(CH$_2$)$_m$—O—, —O—CO—NR—, —O—CO—NR—Y—●—Y—NR—CO—NR— or —O—CO—NR—●—CR$_2$—●—NR—CO— NR— or wherein X together with 2 adjacent C atoms of the backbone of the polymer ○ forms a C$_5$ or C$_6$ ring;
R is the same or different and is H, C$_1$-C$_5$ alkyl, phenyl or the residue of a Michael acceptor;
Y is the same or different and is a linear or branched C$_1$-C$_5$ alkylene or a single bond between N and ● and
● is phenylene, naphthylene, cyclohexylene or C$_4$-C$_{10}$ n-alkylene, unsubstituted or 1-, 2- or 3-fold substituted with C$_1$-C$_3$ alkyl;
m is the same or different and is a whole number from 1 to 8;
n is whole number from 0 to 2; and
p is a whole number from 1 to 50 or for the case that X is —CH$_2$)$_m$—O—, or X with two adjacent C atoms of the backbone of the polymer ○ forms a C$_5$ or C$_6$ ring, then p is 1 to 100, and
the composition comprises one or more crosslinking catalysts selected from the group consisting of bis(ethyl acetoacetato)bis(isobutan-1-olato)-titanium, titanium (IV) isopropanolate, titanium (IV) acetylacetonate, iron (III) acetylacetonate, aluminium triisopropanolate, dibutyltin dilaurate, dioctyltin dilaurate, amidines or amidine derivatives, 1,4-diazabicyclo[2,2,2]octane, 1,8-diazabicyclo[5.4.0]-undec-7-ene, 1,5-diazabicyclo [4.3.0]-non-5-ene, guanidine, guanidine derivatives, acetic acid, acetic acid derivatives, methanesulphonic acid, p-toluenesulfonic acid.

3. The method according to claim 2, wherein:
○ is a polymer with a molecular weight Mw of 1000 to 20000;
R$^3$ is methyl, ethyl or phenyl;
R$^4$ is methyl or ethyl;
Y is methylene;
● comprises C$_1$-C$_3$ alkyl that is methyl;
m is 1 to 4;
n is 0 or 1; and
p is 2 to 4, or for the case that X is —CH$_2$)$_m$—O—, or X with two adjacent C atoms of the backbone of the polymer ○ forms a C$_5$ or C$_6$ ring, then p is 5 to 10.

4. The method according to claim 2, wherein:
○ is a polymer with a molecular weight Mw of 4000 to 20000;
m is 1 to 3;
n is 0; and
p is 2 to 3.

5. The method according to claim 2 further comprising mixing the compound of the formula (I) with a drying agent prior to adding the prepolymer to the compound of formula (I).

6. The method according to claim 5, wherein said method further comprises checking the drying effected by the drying agent added prior to the prepolymer addition.

7. The method according to claim 6 further comprising mixing additional drying agent after adding the prepolymer to the compound of the formula (I).

8. A composition containing a silane-functionalized prepolymer and a compound of the formula (I)

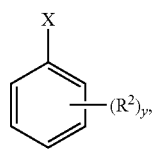

(I)

wherein X represents a substituent —C(=O)—R$^1$;
R$^1$ is selected from the group consisting of —OH and residues with 1 to 12 C atoms;
y=5; and
R$^2$ are residues which are the same or different and are selected from the group consisting of —H, —OH and residues with 1 to 12 C atoms,
and one to three of the residues R$^2$ are —OH, with a maximum of two —OH residues situated on adjacent carbon atoms.

9. The composition accordin claim 8, wherein at least one of the residues R$^2$ is —OH.

10. The composition according to claim 8, wherein two of the residues R$^2$ are —OH and three of the residues R$^2$ are —H.

11. The composition according to claim 8, wherein R$^1$ is —OH and at least two of the residues R$^2$ is —OH.

12. The composition according to claim 8, wherein R$^1$ is —OH, two of the residues R$^2$ are —OH and are located on adjacent C atoms and three of the residues R$^2$ are —H.

13. The composition according to claim 8, wherein the composition contains the compound of the formula (I) in an amount from 0.005 to 0.5 wt. %.

14. The composition according to claim 8, wherein the composition Contains the compound of the formula (I) in an amount from 0.01 to 0.5 wt. %.

15. The composition according to claim 8, wherein the composition contains the compound of the formula (I) in an amount from 0.011 to 0.4 wt. %.

16. The composition according to claim 8, wherein the composition contains additives selected from the group consisting of fillers, plasticizers, drying agents, adhesion promoters, coloured pigments, colourants, antioxidants, UV stabilizers, rheology additives, thinners, thickeners, catalysts and preservatives.

17. Adhesives, sealants, coatings and/or primers comprising a composition formed from
(i) compound of the formula (I)

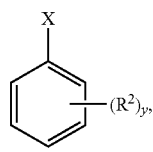

(I)

wherein X represents a substituent —C(=O)—R$^1$; R$^1$ is selected from the group consisting of —OH and residues with 1 to 12 C atoms; y=5 and the residues R$^2$ are the same or different and are selected from the group consisting of —H, —OH and residues with 1 to 12 C atoms,
(ii) polymer consisting of silane-functionalized prepolymers and
(iii) a drying agent
wherein the composition exhibits increased tensile shear strength in the hardened state in comparison to comparable compositions that do no comprise the compound formula (I).

18. The composition according to claim 17, wherein the composition includes one or more crosslinking catalysts.

19. A method for producing adhesives, sealants, coatings and/or primers according to claim 17 comprising mixing silane-functionalized prepolymers with the compound of the formula (I)

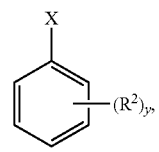

(I)

wherein X represents a substituent —C(=O)—R$^1$;
R$^1$ is selected from the group consisting of —OH and residues with 1 to 12 C atoms;
y=5 and
the residues R$^2$ are the same or different and are selected from the group consisting of —H, —OH and residues with 1 to 12 C atoms.

20. Adhesives, sealants, coatings and/or primers according to claim 17, wherein said increase is an up to 32% higher tensile shear strength.

21. The composition according to claim 18, wherein the crosslinking catalysts, which are selected from the group consisting of bis(ethyl acetoacetato)bis(isobutan-1-olato)-titanium, titanium(IV) isopropanolate, titanium (IV) acetylacetonate, iron(III) acetylacetonate, aluminium triisopropanolate, dibutyltin dilaurate, dioctyltin dilaurate, amidines or amidine derivatives, 1,4-diazabicyclo[2,2,2]octane, 1,8-diazabicyclo[5.4.0]-undec-7-ene, 1,5-diazabicyclo[4.3.0]-non-5-ene, guanidine, guanidine derivatives, acetic acid, acetic acid derivatives, methanesulphonic acid, p-toluenesulfonic acid.

22. Adhesives, sealants, coatings and/or primers comprising a composition formed from
(i) a compound of formula (I)

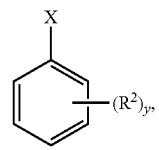

(J)

wherein X represents a substituent —C(=O)—R$^1$; R$^1$ is selected from the group consisting of —OH and residues with 1 to 12 C atoms; y=5 and residues R$^2$ are the same or different and are selected from the group consisting of —H, —OH and residues with 1 to 12 C atoms;

(ii) a catalyst selected from one or more of bis(ethyl acetoacetato) bis(isobutan-1-olato)-titanium, titanium (IV) iospropanolate, titanium (IV) acetylacetonate, iron (III) acetylacetonate, aluminium triisopropanolate, dibutyltin dilaurate or dioctyltin dilaurate;

(iii) silane-functionalized prepolymers; and (iv) drying agent wherein the compound of the formula (I) is present in an amount ranging from 0.005 to 0.02 wt % and said catalyst is present in an amount ranging from 0.03 to 2 wt %.

23. Adhesives, sealants, coatings and/or primers according to claim 22, wherein said adhesives, sealants, coatings and/or primers comprise amine catalyst and titanium catalyst.

24. Adhesives, sealants, coatings and/or primers according to claim 22, wherein said compound of formula (I) is gallic acid;

said catalyst is bis(ethyl acetoacetato) bis(isobutan-1-olato)-titanium; and the gallic acid and the catalyst are present in a 1:1.5 weight ratio, respectively.

25. Adhesives, sealants, coatings and/or primers comprising a composition according to claim 22, wherein said composition further comprises additives consisting of fillers, plasticizers, adhesion promoters, colored pigments, antioxidants, UV stabilizers, rheology additives, thinners, thickeners, catalysts or preservatives.

* * * * *

UNITED STATES PATENT AND TRADEMARK OFFICE
CERTIFICATE OF CORRECTION

Page 1 of 1

PATENT NO. : 11,059,953 B2
APPLICATION NO. : 16/178695
DATED : July 13, 2021
INVENTOR(S) : Holger Wickel It is certified that error appears in the above-identified patent and that said Letters Patent is hereby corrected as shown below:

In the Claims

Column 12
Claim 2, Line 18 delete "–O–CO–NR–" and insert -- –OC–O–NR– --
Claim 2, Line 27 delete "C1-C5" and insert --C1-C8--

Column 13
Claim 9, Line 32 delete "accordin" and insert --according to--

Column 14
Claim 17, Line 11 delete "no" and insert --not--
Claim 21, Line 45 delete "1,4diazabicyclo[2,2,2]octane" and insert --1,4diazabicyclo[2.2.2]octane--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*